Patented Mar. 6, 1934

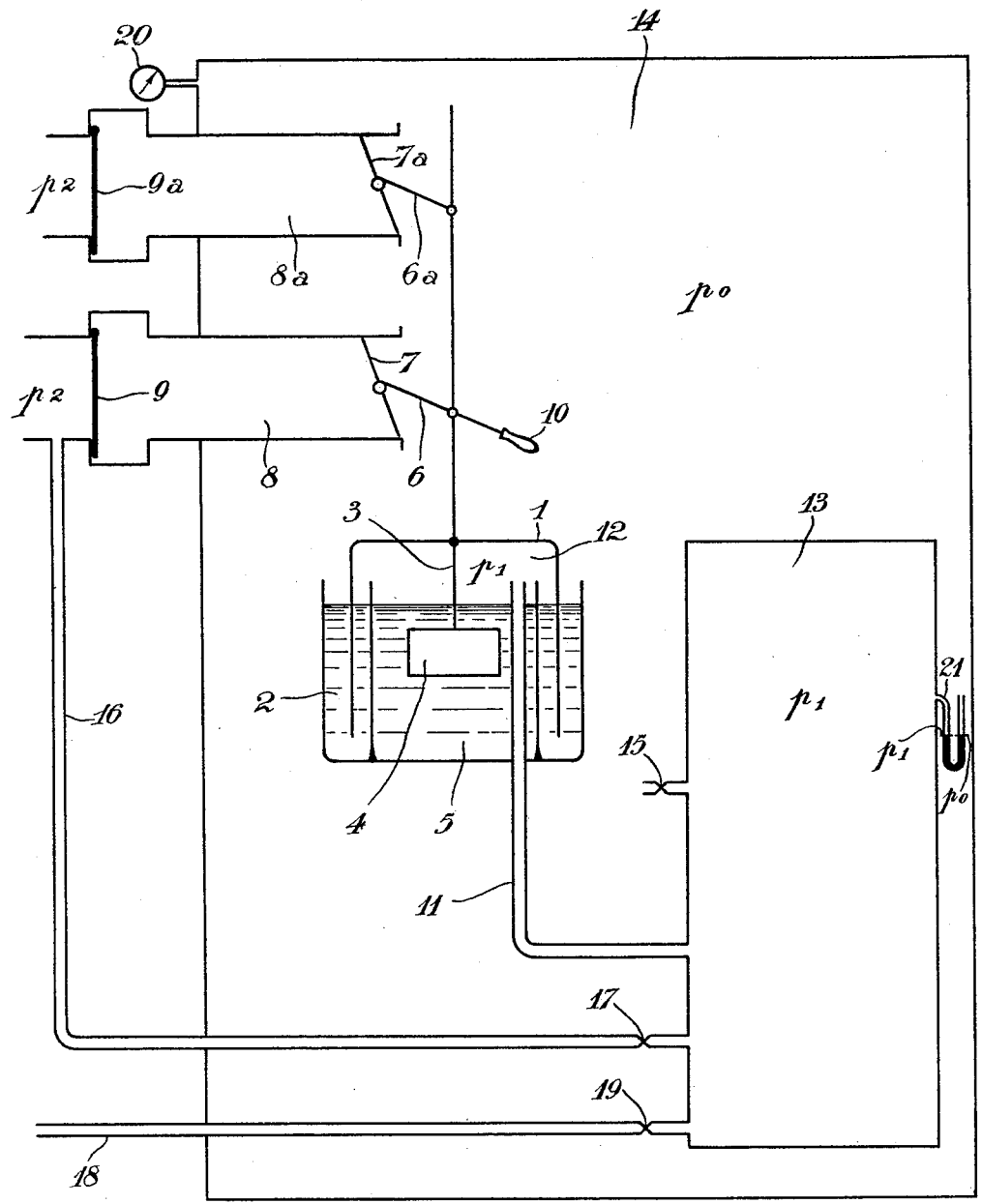

1,949,959

UNITED STATES PATENT OFFICE 1,949,959

PRESSURE REGULATOR FOR WORK UNDER COMPRESSED AIR

Edgard Frankignoul and Léon de la Vallée Poussin, Brussels, Belgium; said Frankignoul assignor to Compagnie Internationale Des Pieux Armes Frankignoul, Société Anonyme, Liege, Belgium Application September 6, 1932, Serial No. 631,942
In France, Germany, Great Britain, and the Netherlands July 26, 1932

5 Claims. (Cl. 61—81)

Our invention relates to a pressure regulator for work under compressed air, which enables a place to be kept automatically supplied with compressed air, at a given normal pressure, and enables this normal pressure to be varied at will, by means of an operation which is easy to execute either from inside or from outside the said place.

In regulators of the kind hitherto utilized the sluices for admitting air under pressure have been actuated by hand and in a continuous manner from the exterior of the place supplied with compressed air according to the variations of the pressure prevailing in that place. This manual operation, while being very expensive, and not very reliable, furthermore occasions almost incessant variations of pressure owing to excessive admissions of compressed air, and these variations of pressure may seriously inconvenience the persons who are in the chamber or place supplied with the compressed air.

With a view to obviating these disadvantages the present invention provides means for regulating the pressure by varying the supply, these means having very great sensitiveness and compensating immediately and automatically for all variations in pressure occurring in the place supplied, so as to maintain therein a practically constant pressure, such as could not be maintained with the systems already known.

For these purposes the regulating device according to this invention comprises for example a balanced floating bell, subjected on the one hand to the pressure of the medium at the place in question and on the other hand to the opposing action of compressed air of constant pressure contained in a regulating reservoir of large capacity, the said bell actuating the valves that admit air under pressure into the said place, so as to compensate automatically and immediately for losses of pressure occurring therein.

Merely by way of example one form of construction of the invention will now be described with reference to the accompanying drawing, which shows diagrammatically in sectional elevation the apparatus according to the invention.

In this drawing, 1 denotes the balanced bell immersed with free lateral displacement in a water seal 2, and supported at the centre, through the medium of the rod 3, by a float 4 immersed in a water bath 5. To an upward extension of the rod 3 are jointed levers 6 and $6a$ controlling valves 7 and $7a$ respectively for the admission of air under pressure from pipes 8 and $8a$, which are provided with stop valves 9 and $9a$. The valves 7 and $7a$ can also be operated by hand by means of a hand lever 10 integral with the lever 6.

A pipe 11 passing through the bath 5 and opening underneath the bell 1 establishes permanent communication between the space 12 inside the bell and a regulating reservoir 13 of large capacity.

All this apparatus is placed in the chamber or place 14 that is to be supplied with compressed air, such for example as a working space for the construction of tunnels. The tank 13 may be put into communication with the chamber 14 by means of a cock 15. Furthermore this tank is connected to the feed piping 8 by a pipe 16 provided with a cock 17 and opening into the said piping at a point preceding the stop valve 9, while it can be opened to the atmosphere by means of a pipe 18, controlled by a cock 19.

A pressure gauge 20 enables the pressure prevailing in the chamber 14 to be ascertained from outside, and a water-column manometer 21 indicates the difference in pressure between this chamber and the reservoir 13.

The chamber 14 can be initially subjected to the desired pressure by opening the valve 7 and $7a$ by hand by means of the lever 10, or else by a lever mounted on an extension of the rod 3 to the outside of the chamber 14. The cock 15 remains open until the desired steady pressure, denoted by $p_1$, is reached. The valves 7 and $7a$ and the cock 15 are then closed. The pressure $p_0$ prevailing in the chamber 14 will then be equal to the pressure $p_1$ of the air stored in the tank 13, the pipe 11, and the space 12. The apparatus will then be in the position illustrated in the drawing.

Since in works under compressed air the working space 14 is never air-tight, since one of its walls generally consists of a mass of earth, there will inevitably be continuous losses of pressure, so that $p_0$ will become less than $p_1$. The bell 1 will then be subjected on its upper face to the pressure $p_0$, and on its lower face to the pressure $p_1$. The bell will ascend and will open the valves 7 and $7a$, which will admit compressed air at the pressure $p_2$, which is greater than $p_1$. The pressure $p_0$ will gradually increase, and will cause the bell 1 to descend until the pressure $p_0$ again reaches the value $p_1$, and when that occurs the valves 7 and $7a$ will be closed.

If on the other hand the pressure $p_0$ becomes greater than $p_1$, as a result of the use of pneumatic tools for instance, the bell will have a tendency to descend and will keep the valves 7 and $7a$ closed until the escape of air into the soil has returned $p_0$ to a value lower than $p_1$. When the normal pressure $p_1$ is once established in the tank 13, the apparatus will automatically maintain the pressure in the chamber 14 at a practically constant value equal to $p_1$.

It is of course understood that the capacity of the reservoir 13 will be made sufficiently great for variations in the volume of the chamber 12 not to cause appreciable variations in the pressure $p_1$.

Under these conditions the regulator will act for the slightest fluctuations of pressure in the chamber 14, thanks to the balancing of the bell 1 and to the exceedingly small resistance offered to displacements thereof.

In order to modify the steady pressure to be maintained, all that is necessary is to act upon the pressure $p_1$, since the regulator maintains the normal pressure constantly equal to this pressure $p_1$.

The pressure $p_1$ can be increased by opening the cock 17, so as to introduce air at the pressure $p_2$ until the desired value of $p_1$ is reached, while a diminution in the pressure $p_1$ can be brought about by opening the cock 19 and allowing the necessary quantity of compressed air to escape to the atmosphere.

If desired it is also possible to provide a suitable operating device controlled from outside the chamber 14 for the purpose of putting the reservoir 13 into communication either with the pipe 8 or with the atmosphere, for the purpose of obtaining the variations contemplated in the steady pressure to be maintained.

As soon as the new steady pressure is obtained in the reservoir 13, the bell 1 will act upon the valves 7 and 7a in the manner set forth above, so as to maintain in all cases the desired normal pressure in the chamber 14.

It is quite understood that without altering in any way the functioning of the apparatus the balanced floating bell may be replaced by any other suitable controlling member, for instance a diaphragm or bellows of india rubber or of impervious linen forming a movable partition between the regulating tank and the chamber 14, this diaphragm or bellows actuating the valve or valves 7, 7a under the action of the difference between the pressures acting upon the two faces thereof.

What I claim is:

1. A caisson or like chamber in which air under pressure is to be maintained to permit working therein, a reservoir of large capacity arranged in the caisson and designed to contain air at a practically constant pressure, a valve for admitting air under pressure to the caisson, a movable wall open at one side to the pressure in the caisson and on the other side to the pressure in the reservoir, and connecting means between said wall and said valve to control the opening and closing of the valve in accordance with the movement of said wall under unbalanced pressures in the reservoir and caisson.

2. A construction as defined in claim 1, wherein the movable wall consists of a balanced floating bell immersed in a water seal and supported at the center through the medium of a rib by a float supported by the water seal, the space between the bell and the level of the water seal being in open communication with the reservoir.

3. A device as claimed in claim 1, including the provision of a control lever connected to the admission valve and to the movable wall for transmitting displacements of said movable wall to said valve.

4. A device as claimed in claim 1, together with the provision of a rod connected to said wall and to said valve for transmitting displacements of the wall to the valve, and a hand lever connected to said rod to provide for manual operation of the valve at will.

5. A construction as described in claim 1, wherein the reservoir is in communication with the source of compressed air beyond the caisson, and means are provided whereby the reservoir may be exhausted to the atmosphere.

EDGARD FRANKIGNOUL.
LÉON DE LA VALLÉE POUSSIN.